April 11, 1967     B. A. SEIDENFELD     3,313,579
BRAKE CAM SHAFT MOUNTING
Filed March 12, 1964
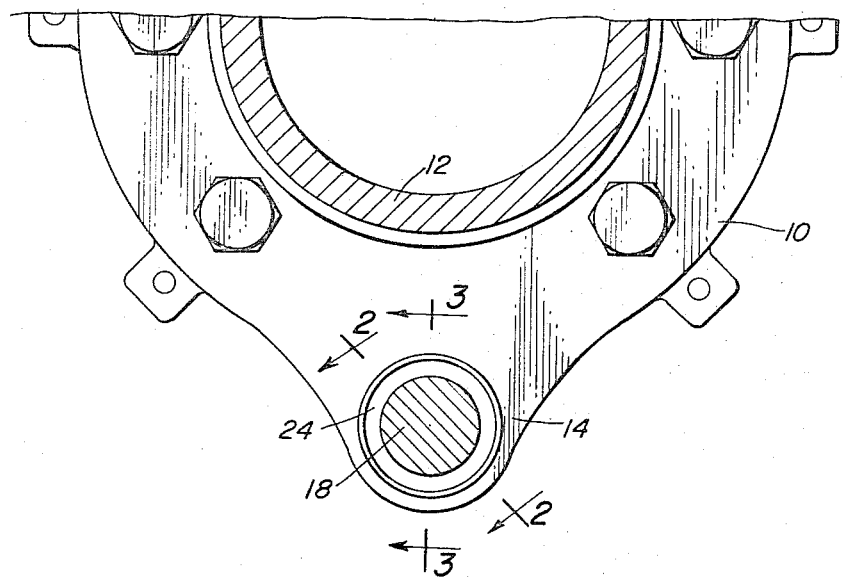
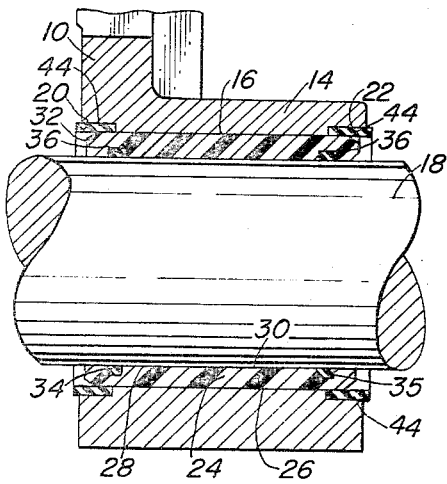 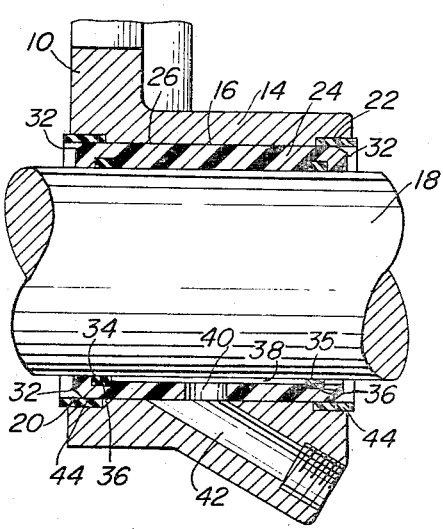
INVENTOR.
BENJAMIN A. SEIDENFELD
BY Max R. Kraus
ATTY.

3,313,579
BRAKE CAM SHAFT MOUNTING
Benjamin A. Seidenfeld, 57 E. 16th St.,
Chicago, Ill. 60605
Filed Mar. 12, 1964, Ser. No. 351,457
3 Claims. (Cl. 308—36.2)

This invention relates to improvements in brake cam shaft mounting.

One of the objects of this invention is to provide improved means for mounting a rotatable shaft, and more specifically to a bushing particularly adapted for use in a brake cam shaft assembly in automotive vehicle brakes.

This invention is an improvement over the type of cam shaft mounting shown in Patent No. 3,076,683, and one of the objects of this invention is to provide a single bushing so constructed that it may be inserted from either side of the brake assembly, in contrast to the prior art in which by reason of the flanged bushing can be inserted from one side only.

Another object of this invention is to provide a single bushing having a uniform O.D. dimension with no external flanges, and wherein the O.D. sealing rings are mounted on the bushing after the bushing is inserted in the support. This provides a larger continuous bearing surface for the bushing in relation to the support and also permits a reduction in the cost of manufacture of the bushing in that flanges and the like are eliminated. It also facilitates the insertion of the bushing as the bushing may be inserted from either side and the sealing rings may be readily applied after the bushing has been inserted in the support.

Other objects will become apparent as this description progresses.

In the drawings:

FIG. 1 is a fragmentary view showing the lower half of a brake supporting spider with the cam shaft and with the bushing forming this invention journalled therein.

FIG. 2 is an enlarged longitudinal cross-sectional view through the cam shaft support of the brake spider along the lines 2—2 of FIG. 1, and FIG. 3 is a view similar to FIG. 2 but taken on lines 3—3 of FIG. 1.

Referring to the drawings, particularly FIG. 1, the lower half of the brake supporting spider is indicated at 10, which is welded or otherwise suitably secured to the axle housing 12 to provide the conventional support for any known cam actuated brake mechanism. The brake spider 10 is provided with an outwardly extending boss portion 14 having a cylindrical through bore 16. The boss portion 14 provides a support for a brake cam shaft 18 extending therethrough. The brake cam shaft 18 is provided at its spider end with the usual cam (not shown) and the opposite end carries a brake lever (not shown). When the brake lever is actuated the cam shaft 18 and the cam are rotated to spread opposed brake shoes pivotally supported on the brake spider 10 apart against a rotating wheel supported brake drum.

The foregoing structure is well-known in vehicle brake mechanisms of this character and is shown in Patent No. 3,076,683 and will not be illustrated or described with any more particularity. The other end of the cam shaft 18 may be supported in a cam shaft bracket, as is well known in the art.

To facilitate rotation of the cam shaft 18 and to provide sufficient alinement and stability, the cam shaft 18 is journalled at both ends in bearings or bushings. The bore 16 of the brake spider boss 14 is provided at both ends with counter bores 20 and 22. In the prior art constructions a pair of bushings were inserted in said bore 16; each bushing had at one end an outwardly projecting circumferential flange, which flange was adapted to fit into the counter bore. This necessitated inserting each bushing from each opposite end. In accordance with this invention the pairs of bushings are eliminated and there is provided a single bushing, indicated by the numeral 24, which is inserted endwise in the bore 16 to rotatably support the cam shaft 18. The bushing 24 forming this invention has no circumferential flange. The O.D. of the bushing is uniform, except for the inwardly tapering ends, and, therefore, the bushing may be inserted endwise from either side or end of the support.

The bushing 24 is molded or otherwise formed of a nylon material which is a tough, corrosion resistant, non-metallic material, and provides a generally smooth cylindrical outer surface 26 and a generally smooth cylindrical bore 28 which closely surrounds the bearing surface 30 of the cam shaft 18. The opposite ends of the external surface of the bushing has a slight external taper indicated by the numeral 32.

The inside surface of the bushing is provided with a continuous circumferential groove 34 adjacent one end and a circumferential groove 35 adjacent the other end of the bushing. The circumferential grooves 34 and 35 are each substantially square in cross-section and each groove is adapted to receive an inner resilient ring seal 36 of normally square cross-section, as best shown in FIGS. 2 and 3. Each resilient ring 36 extends slightly inwardly of the bore 28 of the bushing and is adapted to engage the cam shaft 18 and form a seal therewith. The inside surface 28 of the bushing is provided with a longitudinally extending groove or channel 38 which extends to the end of the bushing, past the circumferential groove 35 on one side, to provide a pressure relief channel when the bushing 24 is lubricated, and extends up to the circumferential groove 34 at the opposite side. The channel 38 communicates with both circumferential grooves 34 and 35. The bushing 24 is also provided with a central opening 40 communicating with the longitudinal inner groove 38.

When the bushing is inserted in the support 14, the opening 40 is alined with the lubricating channel 42 in the support and the lubricating channel 42 is adapted to receive a lubrication fitting (not shown) which may be provided in the spider boss 14 to lubricate the bearing assembly.

The bushing 24 may be inserted, as heretofore stated, from either side of the support 14, and after the bushing is inserted a pair of O.D. sealing rings 44 are installed in counter bores 20 and 22. These O.D. sealing rings extend slightly beyond the surfaces of the support 14. The O.D. sealing rings are made of neoprene or a grease resistant compound and the cross-section of the ring has square corners. These rings are compressed by washers (not shown) installed on shaft 18 and in effect provide an external seal for the bushing.

The present invention, therefore, provides a novel spider cam shaft bushing which has an extended service life and requires a minimum of maintenance and is provided with self-sealing features which effectively retain the lubricant in the spider housing and prevent the lubricant from leaking into the brake drum and the entry of foreign matter into the journal assembly. Further, the bushing may be easily and inexpensively made. It is not subject to any appreciable wear or damage and may also be operated without a lubricant.

It will be understood that various changes and modifications may be made from the foregoing without departing from the spirit and scope of the appended claims.

What is claimed is:

1. A bearing assembly for a brake cam shaft comprising a support having a through-bore provided with counterbored ends, a bushing having a single substantially resilient elongated main body portion having cylindrical inner and outer surfaces, said outer surface having a diameter throughout substantially that of the through-bore to permit said bushing to be inserted endwise through either of the opposite ends of the support, said inner surface of the bushing having a respective circumferential groove adjacent each of the two opposite ends of said bushing and inwardly of the opposite ends of the bushing, each said two circumferential grooves adapted to each receive a resilient sealing member which is nested within the grooves of the bushing, a sealing ring positioned on said outer surface of said bushing adjacent each of the two opposite ends of said bushing and disposed within the associated counter-bore and sealingly engaging the peripheral wall of said counter-bore, said inner surface having a longitudinally extending groove communicating with each said two inner circumferential grooves.

2. In a bearing assembly for rotatably mounting a shaft comprising a support having a through-bore provided with counter-bored ends, a single bushing made of plastic, said bushing having an elongated annular body portion having an inner surface adapted to closely surround in bearing fit the external surface of a shaft and an external surface closely fitting the surface of said bore, said bushing having a uniform outside diameter to permit said bushing to be inserted in said support endwise from either end of said support, an outer ring seal carried on each of the two opposite ends of said bushing and disposed within the associated counter-bore and sealingly engaging the peripheral wall of said counter-bore, a respective inner circumferential groove on the inside of said bushing adjacent each of the two opposite ends of said bushing and inwardly of the opposite ends of the bushing, a resilient sealing member supported within each said two circumferential grooves which are nested within said grooves and adapted to engage the cam shaft.

3. In the combination according to claim 2, wherein the said bushing is provided with a longitudinal inner groove communicating with the opposite circumferential inner grooves.

References Cited by the Examiner

UNITED STATES PATENTS

| | | | |
|---|---|---|---|
| 537,172 | 4/1895 | Albrecht | 308—36.1 X |
| 984,456 | 2/1911 | Trenary | 308—36.1 X |
| 2,188,862 | 1/1940 | Horger | 308—26 X |
| 2,356,027 | 8/1944 | Boyd et al. | 308—238 X |
| 2,642,318 | 6/1953 | Ricks | 287—93 X |
| 2,923,579 | 2/1960 | Scheel | 308—36.1 X |
| 2,960,353 | 11/1960 | Woodling | 285—212 X |

FOREIGN PATENTS 604 10/1892 Great Britain.

MARTIN P. SCHWADRON, *Primary Examiner.*

DAVID J. WILLIAMOWSKY, EDGAR W. GEOGHEGAN, *Examiners.*

R. F. HESS, *Assistant Examiner.*